(12) United States Patent
Pirnar (10) Patent No.: US 12,545,424 B2
(45) Date of Patent: Feb. 10, 2026

(54) COOLING SYSTEM FOR A VEHICLE ENGINE UNIT AND METHOD FOR FILLING SUCH A COOLING SYSTEM

(71) Applicant: Pipistrel d.o.o., Ajdovscina (SI)

(72) Inventor: Jernej Pirnar, Ajdovscina (SI)

(73) Assignee: Pipistrel d.o.o., Ajdovscina (SI)

( * ) Notice: Subject to any disclaimer, the term of this patent is extended or adjusted under 35 U.S.C. 154(b) by 85 days.

(21) Appl. No.: 18/498,982

(22) Filed: Oct. 31, 2023

(65) Prior Publication Data

US 2025/0136288 A1    May 1, 2025

(51) Int. Cl.
*B64D 33/10* (2006.01)
*B64C 29/00* (2006.01)

(52) U.S. Cl.
CPC .......... *B64D 33/10* (2013.01); *B64C 29/0025* (2013.01)

(58) Field of Classification Search
CPC ............................ B64D 33/10; B64C 29/0025
See application file for complete search history.

(56) References Cited

U.S. PATENT DOCUMENTS

| | | | |
|---|---|---|---|
| 11,613,350 | B1 | 3/2023 | Bodla et al. |
| 11,679,872 | B1 | 6/2023 | Tulsyan et al. |
| 12,296,972 | B2 | 5/2025 | Asanuma et al. |
| 2019/0047699 | A1 | 2/2019 | Bonden et al. |
| 2020/0006827 | A1 | 1/2020 | Filter et al. |
| 2023/0192289 | A1* | 6/2023 | Fukuchi .............. B64C 29/0025 244/4 R |

* cited by examiner

*Primary Examiner* — Elizabeth J Martin
(74) *Attorney, Agent, or Firm* — SLATER MATSIL, LLP (57) ABSTRACT

A vehicle including a boom having a first opening at a first surface and a second opening at an opposite second surface, a channel extending in a first direction between the first and second openings and connecting the first opening with the second opening and a heat exchanger arranged in the channel, where the heat exchanger is tilted with respect to the first direction.

20 Claims, 10 Drawing Sheets

COOLING SYSTEM FOR A VEHICLE ENGINE UNIT AND METHOD FOR FILLING SUCH A COOLING SYSTEM

TECHNICAL FIELD

The present invention generally relates to a cooling system for a vehicle engine unit and a method for filling and assembling such a cooling system, and, in particular embodiments, to a cooling system for a vertical thrust unit (VTU) and a method for filling and assembling such a system.

BACKGROUND

Various cooling systems for vehicles are known.

SUMMARY

In accordance with an embodiment a vehicle includes a boom having a first opening at a first surface and a second opening at an opposite second surface, a channel extending in a first direction between the first and second openings and connecting the first opening with the second opening and a heat exchanger arranged in the channel, wherein the heat exchanger is tilted with respect to the first direction.

In accordance with an embodiment a vehicle includes at least two vertical thrust units, each vertical thrust unit of the at least two vertical thrust units have a cooling system comprising an electrical pump, an motor controller connected to the electrical pump, a motor connected to the motor controller, a heat exchanger connected to the motor, a coolant container connected to the heat exchanger, coolant lines providing the connections and coolant flowable in the cooling system, wherein the cooling system with the coolant container and the coolant stored therein of one vertical thrust unit is configured to absorb thermal energy so that a time of operation, before an overheating of the one vertical thrust unit begins, is increased by approximately 30%-50% compared to the cooling system of the one vertical thrust unit without the coolant container when another one of the vertical thrust units fails, and wherein the vehicle is an aviation vehicle.

In accordance with an embodiment a method for filling a cooling system with a coolant includes filling a first part of the cooling system of a vehicle engine unit with a first coolant, wherein the first part of the cooling system comprises first coolant lines and coolant lines of a motor, filling a second part of the cooling system of the vehicle engine unit with a second coolant, wherein the second part of the cooling system comprises a heat exchanger, a coolant storage container and second coolant lines, mounting the first part of the vehicle engine unit into a vehicle, mounting the second part of the vehicle engine unit into the vehicle and connecting first ends of the first coolant lines with first ends of the second coolant lines thereby forming a circular cooling system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments provide a cooling system for a vehicle engine unit and in particular an vertical thrust unit of an aviation vehicle. The cooling system includes a coolant container storing coolant therein. The coolant container with the coolant is configured to absorb thermal energy in order to increase the time of operation before a vertical thrust unit overheats. This may be the case, when one of several vertical thrust units fails and the remaining one(s) need to increase power output in order to keep the aviation vehicle in the air until, e.g., for safe landing.

Further embodiments provide a cooling system with a coolant container smartly arranged in a boom. The coolant container may be advantageously placed in an opening of the boom for better cooling of the cooling system and improved airflow around the boom.

Yet other embodiments provide an advantageous method for filling the cooling system with a coolant so that no or only little air remains in the cooling system after filling.

Figure 1:
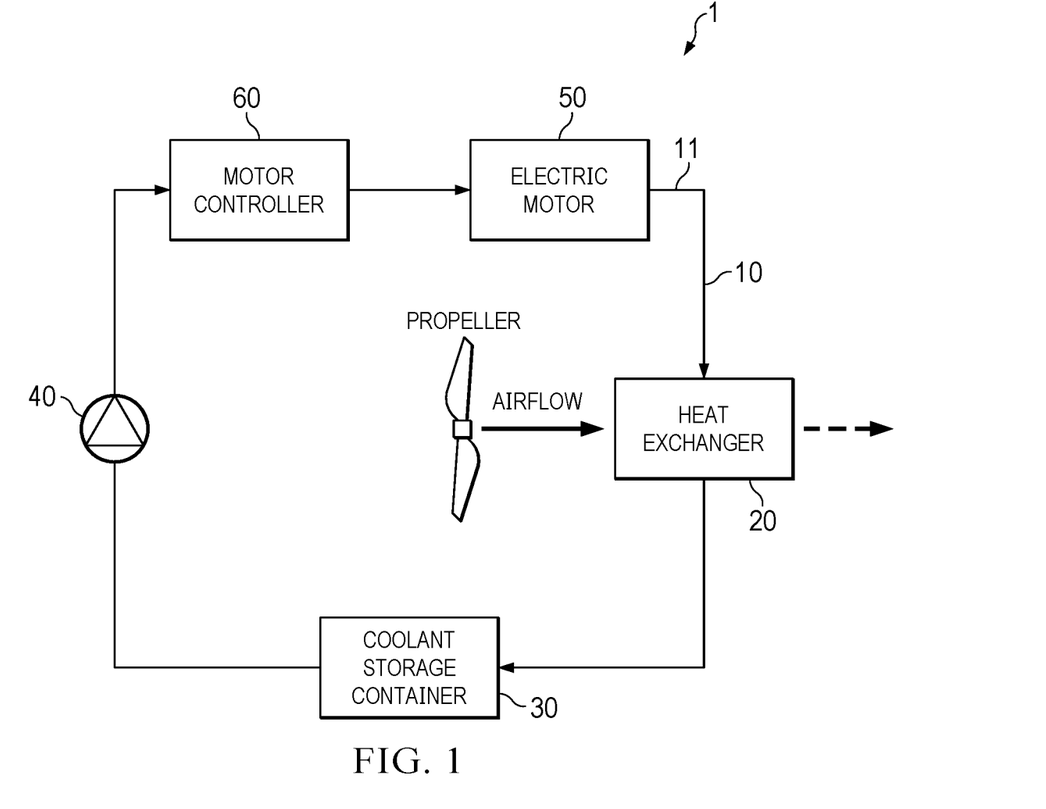
FIG. 1 shows a block diagram of a cooling system according to embodiments.

FIG. 1 shows a block diagram of a cooling system 11 for an vehicle engine unit 1. The related vehicle may be an aviation vehicle such as an aircraft or a drone. According to various embodiments the aviation vehicle may be a vertical take-off and landing (VTOL) aviation vehicle and the vehicle engine unit may be part of a vertical thrust unit (VTU).

The vehicle engine unit 1 comprises a cooling system 11. The cooling system 11, as shown in FIG. 1, may be for a single vehicle engine unit/VTU 1. The cooling system 11 comprises a heat exchanger 20, a coolant storage container 30, a device 40 configured to move the coolant, coolant lines in a motor 50 and coolant lines in a motor controller 60. The components 20-60 of the cooling system 11 may be separate and individual components that are connected by coolant lines 10. The lines 10 may directly connect the components 20-60 to each other. The cooling system 11 may be a closed cooling system 11.

The coolant lines 10 may be flexible, semiflexible or hard tubes or pipes. They might be made of plastic, rubber or a combination thereof. In various embodiments one coolant line 10 connects one of the elements 20-60 to another of the element 20-60. However, alternatively, more than one coolant line 10 can connect one of the elements 20-60 to another one of elements 20-60.

The heat exchanger 20 may be an air-to-coolant-type (e.g., an air-to-liquid-type) heat exchanger such as a radiator.

In various embodiments the heat exchanger is a tube heat exchanger such a fin-and-flat tube heat exchanger or specifically a louvered fin-and-flat tube heat exchanger. The heat exchanger 20 may have an input to which a coolant line 10 is connectable and an output to which another coolant line 10 is connectable.

The coolant storage container 30 may be a buffer tank or reservoir. It may be made of aluminum, steel, plastic or a carbon-fiber reinforced polymer. The coolant storage container 30 may have an input to which a coolant line 10 is connectable and an output to which another coolant line 10 is connectable. In various embodiments the coolant storage container 30 is connected to the other components 20 and 40-60 so that the coolant moves through the container. Accordingly, the coolant storage container 30 may be part of the closed circle of the cooling system 11 and not just an overflow container or buffer tank that, e.g., is connected with a T-junction to the lines 10. The volume of the coolant storage container 30 may have an impact on the temperature of the coolant, i.e., the coolant in the container 30 may be able to absorb or store thermal energy (measured in Joule). In various embodiments, the volume of the container 30 is designed considering the motor 50 and/or the motor controller 60 to be used. For example, under normal system 11/VTU 1 operation (after a start-up phase) the coolant has a temperature between 40-50° C. such as 45° C. and 60-70° C. such as 65° C.

In order to provide a more resilient vehicle engine unit/VTU 1 the coolant to be stored in the system 11 may be 4-times (alternatively, 5-times, 6-times or 8-times) the volume compared to the coolant to be stored in the system 11 without the coolant storage container 30. For example, the system 11 may operate with 0.6 liter of coolant (without the additional capacity for a time safety margin) and with 2.4 liters of coolant to provide for the safety margin. Accordingly, the coolant storage container 30 may comprise a volume of 1.8 liters of coolant, i.e., in this case essentially a factor 3 of the coolant otherwise stored in the system 11. Alternatively, the system 11 may operate with 0.8-1 liter or with 1-2 liters of coolant (without the additional capacity for a time safety margin) and with 3.2-4 liters or with 4-8 liters of coolant to provide for the safety margin. Accordingly, the coolant storage container 30 may comprise a volume of 2.4-3 liters of coolant or a volume of 3-6 liters of coolant.

In various other embodiments the coolant storage container 30 comprises a (n additional) material configured to store thermal heat. The material configured to store thermal heat may be a phase change material. The phase change material may be able to store thermal energy by transitioning from a solid state to a liquid state. For example, inside walls of the coolant storage container 30 may be covered with such a phase change material or, alternatively, the coolant storage container 30 is filled with such a phase change material. The container 30 filled with the phase change material may comprise channels through which the coolant is flowable. The phases change material may be able transition reversibly between the phases (solid to liquid and liquid to solid) over many circles thereby storing and releasing energy. The phase change material may only be located in the coolant storage container 30 and in no other component.

The phase change material (PCM) may be an organic PCM such as paraffin wax. The material is organic-based and has high latent heat of fusion, is chemically stable, non-corrosive, and non-toxic. Solid-to-liquid phase change transition may occur at approximately 44° C. It has a heat storage capacity of up to 250 KJ/kg. Other organic PCM materials may melt at approximately 54° C. and have a heat storage capacity of up to 200 KJ/kg. In various embodiments the PCM material may be a material with a transition temperature between 40° C. and 60° C., inclusive, or between 44° C. and 54° C., inclusive. Moreover, the PCM material may have a storage capacity of between 150 KJ/kg and 250 KJ/kg, inclusive or between 200 KJ/kg and 220 KJ/kg, inclusive.

The device 40 configured to move the coolant might be a pump such as an electric pump. The device 40 may have an input to which a coolant line 10 is connectable and an output to which another coolant line 10 is connectable.

The motor 50 might be an electrical motor. Coolant lines are integrated in the motor 50 in order to cool the motor parts including the drivetrain. The coolant lines of the motor 50 may have an input to which a coolant line 10 is connectable and an output to which another coolant line 10 is connectable.

The motor controller 60 is configured to control the motor. In various embodiments the motor controller 60 is an inverter comprising a driver including various switches. Coolant lines are integrated in the motor controller 60 in order to cool the drive unit. The coolant lines of the motor controller 60 may have an input to which a coolant line 10 is connectable and an output to which another coolant line 10 is connectable.

The coolant may be a liquid such as water, a more vicious liquid (combination of chemicals) or a mixture of the water and the vicious liquid. For example, a liquid coolant may be an ethylene glycol-water mixture with various ratios (e.g., 50/50, 40/60, . . . ). The mixture might have some additional agents added against corrosion, for example. The mixture may include nanoparticles (e.g., copper oxide, aluminum oxide) in order to improve thermophysical properties of the coolant. These liquid coolants may be ethylene glycol (EG)-based nanofluids.

The lines 10 may connect the components 20-60 directly to each other as shown in the FIG. 1. As mentioned above, the cooling system 11 may form a closed circle. In some embodiments additional components may be arranged in the closed circle of the cooling system 11. The components 20-60 may be arranged in a different order. For example, the pump 40 might be arranged between the heat exchanger 20 and the coolant storage container 30.

In various embodiments the coolant storage container 30 is advantageous for providing a safety margin in case a VTU fails. This enables the aviation vehicle to safely land without risking overheating of powertrain components such as the motor controller 60, the electric motor 50 and/or the electric pump 40. The failure may be related to electrical failure shutting down the electric motor and motor controller, or due to loss of cooling (e.g., coolant leakage, or trapped air within the el. motor coolant channels) and subsequent motor and/or motor controller overheating.

Figure 6:
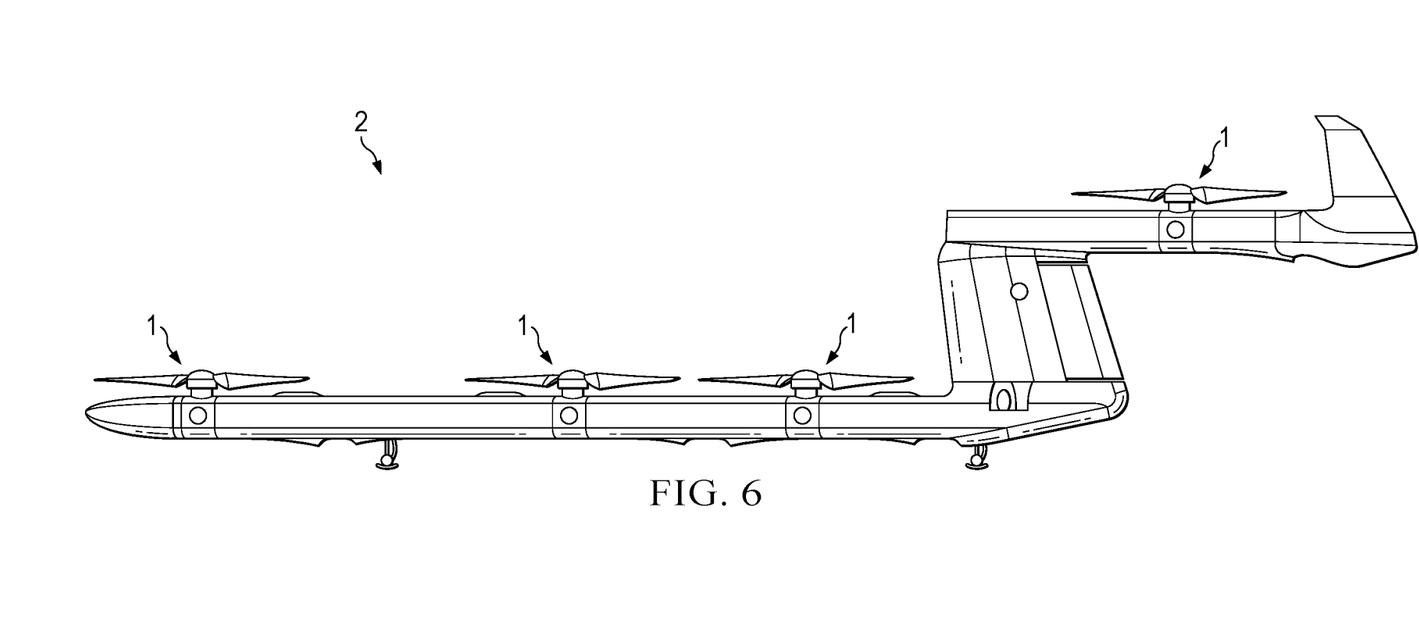
FIG. 6 shows a boom with 4 vertical thrust units according to embodiments.

For example, the aviation vehicle may comprise two booms 2, each on one side of the vehicle and each having 4 VTUs 1 (as shown in FIG. 6), i.e., the vehicle has together 8 VTUs 1. If one VTU 1 is lost due to failure, the system controller (not shown) may turn-off another VTU 1 on the other side (or on the other boom) of the vehicle. Having a vehicle operating with only 6 VTUs 1, the power requirements per remaining VTU 1 may be much higher. Hence, more cooling is needed for these VTUs 1. A coolant storage container 30 provided for each vertical thrust unit 1 will provide this additional cooling capacity. The increased cooling capacity of the novel cooling system 11 will protect the working VTUs 1 against overheating.

This may be particularly important when operating in high outside air temperature (OAT) conditions (e.g., 39 degrees Celsius or above, 37 degrees Celsius and above or 35 degrees Celsius or above) in which radiator (or heat exchanger) heat rejection is significantly decreased. Conversely, if the VTU failure occurs at, e.g., 15 degrees Celsius OAT, the advantages of the coolant storage container may be less or not significant. In various embodiments different requirements for time safety margins (for safely landing the aviation vehicle) may lead to various thermal tuning requirements which may lead to different coolant storage container 30 sizes. As an example, considering some rough aviation vehicle power requirements (under most demanding OAT, e.g., 39 degrees Celsius or above) the cooling system 11 is designed such that the coolant storage container 30 of one VTU 1, in case of a failure of another VTU, may provide heat storage capabilities that may increase the time of operation (until overheating of the VTU begins) by approximately 40% (or 30%-50% or 35% to 45%) compared to a coolant system design without such a coolant storage container. Accordingly, integrating a coolant storage container 30 into the system 11 provides the aviation vehicle with a temperature operational envelope as wide as possible.

Figure 2A:
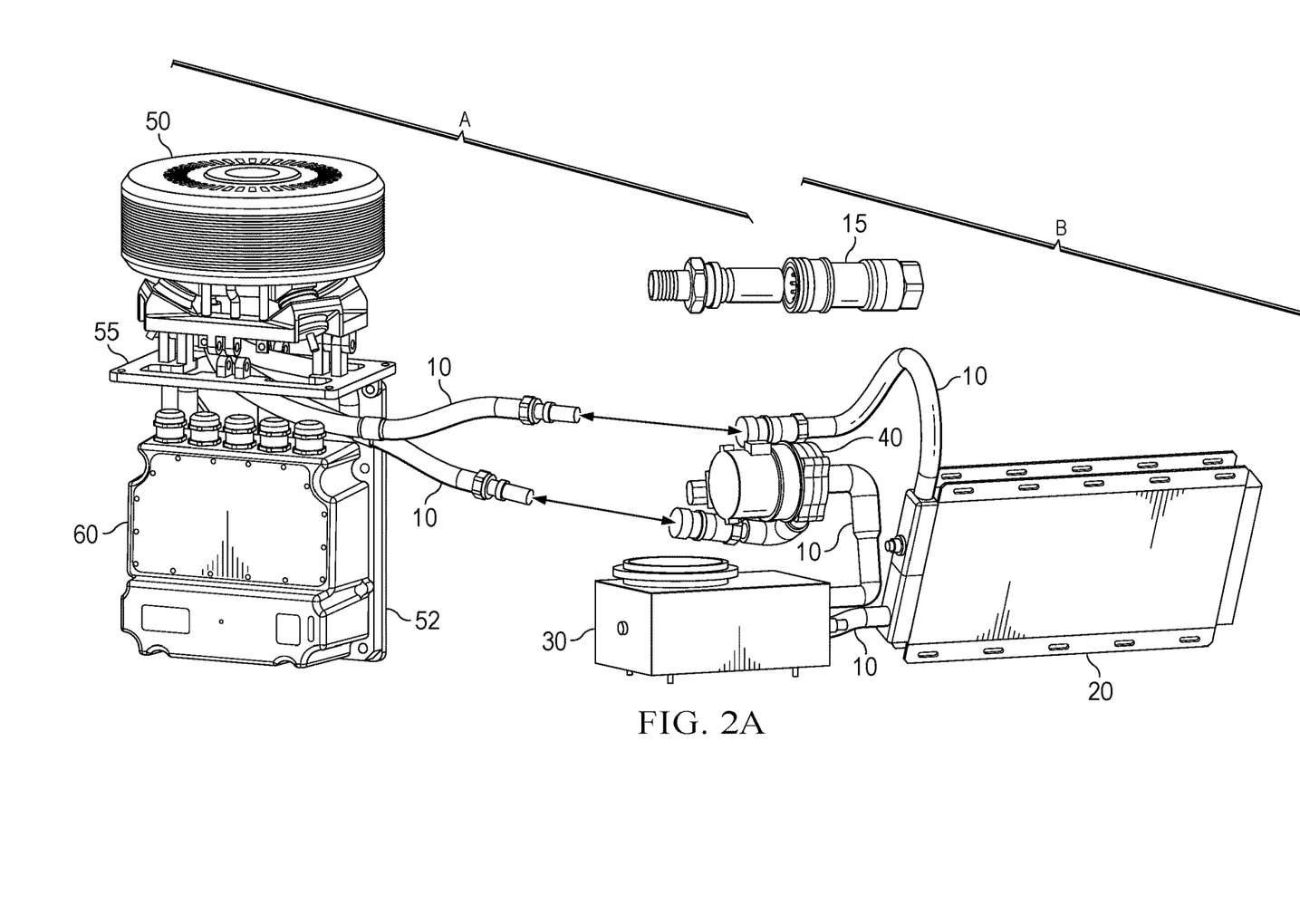
FIG. 2a shows a cooling system implemented in an engine unit having a part A and a part B according to embodiments.

FIG. 2A shows the vehicle engine unit/VTU 1 with the cooling system 11. The vehicle engine unit 1/cooling system 11 may be separated in two parts, a part A and a part B. Part A comprises the motor controller 60 and the motor 50 and part B comprises the heat exchanger 20, the container 30 and the pump 40.

Part A may comprise a first end of a coolant line 10 and a second end of a coolant line 10 and part B may comprise a first end of a coolant line 10 and a second end of a coolant line 10. The first end of the coolant line of part A and the first end of the coolant line of part B may be connected via a first connector 15 and the second end of the coolant line of part A and the second end of the coolant line of part B may be connected with a second connector 15. The first connector and the second connector may be the same or may be different. The first connector may comprise a first portion such as a female part and a second portion such as a male portion. The female portion maybe insertable into the male part and completely seal the connection between the first end of the coolant line of part A and the first end of the coolant line of part B. The second connector may comprise a first portion such as a female part and a second portion such as a male portion. The female portion maybe insertable into the male part and completely seal the connection between the second end of the coolant line of part A and the second end of the coolant line of part B. An arrangement with two parts may be advantageous for mounting the cooling vehicle engine unit 1 in the vehicle because the cooling system 11 can be properly filled.

In various embodiments part A comprising the cooling system 11 of the motor 50 and the motor controller 60 is first filled with a coolant. For example, part A is filled via first and second end portions of coolant lines 10 by filling, pouring or pressing coolant in the coolant lines 10 until the coolant overflows. After the cooling system 11 of part A is completely filled with the coolant the first end portion and the second end portion of the coolant lines 10 is sealed with portions of first and second connector parts (e.g., such as a female portion or a male portion respectively). Next, part B comprising the storage container 30 and the heat exchanger 20 is filled via first and second end portions of coolant lines 10 by filling, pouring or pressing coolant in the coolant lines 10 until the coolant overflows. When the cooling system 11 of part B is completely filled with the coolant the first end portion and the second end portion of the coolant lines 10 may be sealed with portions of the first and second connector parts (e.g., such as a female portion or a male portion respectively). Of course, the filling of part A and part B with coolant can be switched so that part B is first filled and part A is filled afterwards. Or, alternatively, the parts (A and B) are filled at the same time.

In alternative embodiments, portions of the first and second connector parts are already located in the end portions of the coolant lines 10 and are then pressure filled.

After filling the cooling system 11 of the part A and part B with coolant, the part A and part B of the vehicle engine unit 1 are mounted in the vehicle.

After mounting the two ends of the coolant lines 10 of part A and part B are connected so that the cooling system 11 forms a (sealed) closed circle.

Of course the part A and part B may have more or less or even additional components. For example, pump 40 may be part of part A or part B.

Figure 2B:
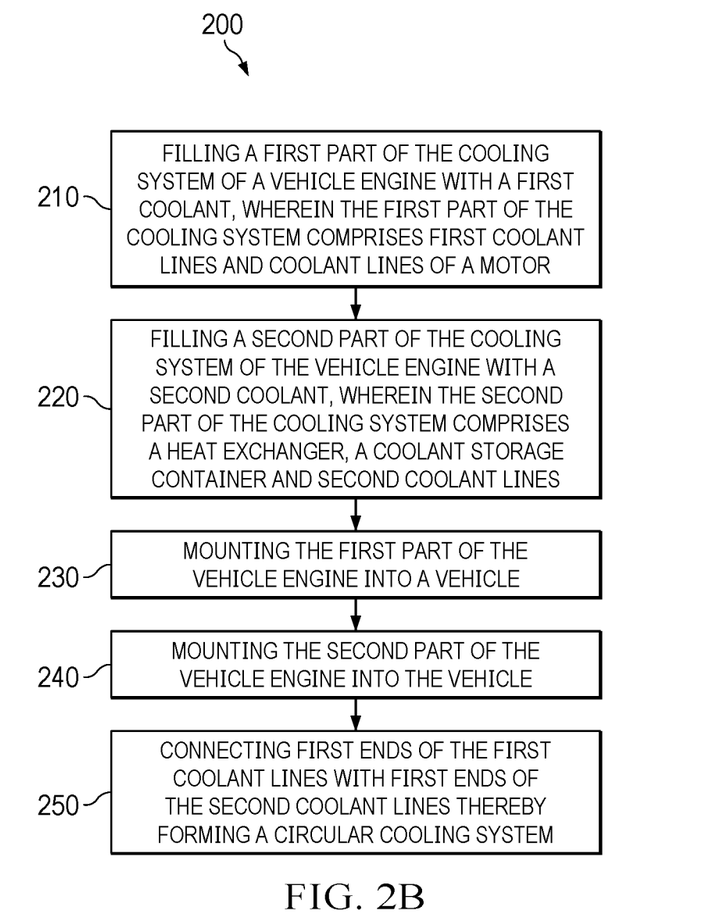
FIG. 2b shows a method for filling a coolant into a cooling system of an engine unit according to embodiments.

A method 200 for filling a cooling system of a vehicle engine unit may include the following: Filling a first part of the cooling system of a vehicle engine unit with a first coolant at 210, wherein the first part of the cooling system comprises first coolant lines, coolant lines of a motor and coolant lines of a motor controller (part A). Filling a second part of the cooling system of the vehicle engine unit with a second coolant at 220, wherein the second part of the cooling system comprises a heat exchanger, a coolant storage container, a pump and second coolant lines (part B). At 230, the first part of the vehicle engine unit is mounted into a vehicle and, at 240, the second part of the vehicle engine unit into is mounted into the vehicle. At 250, first ends of the first coolant lines are connected with first ends of the second coolant lines thereby forming a circular cooling system. In various embodiments, the first coolant and the second coolant are the same.

This method is advantageous with respect to filling the coolant in the engine unit 1 when the engine unit 1 is already mounted in the vehicle. In various embodiments the motor 50 is mounted at the highest point in the vehicle and would either not receive sufficient coolant or the system 11 would lose coolant and air will enter the system 11 during de-airing. Air may end up in the cooling channels of the electric motor 50 and the motor 50 might not be properly cooled which can potentially result in overheating the motor 50.

Figure 3:
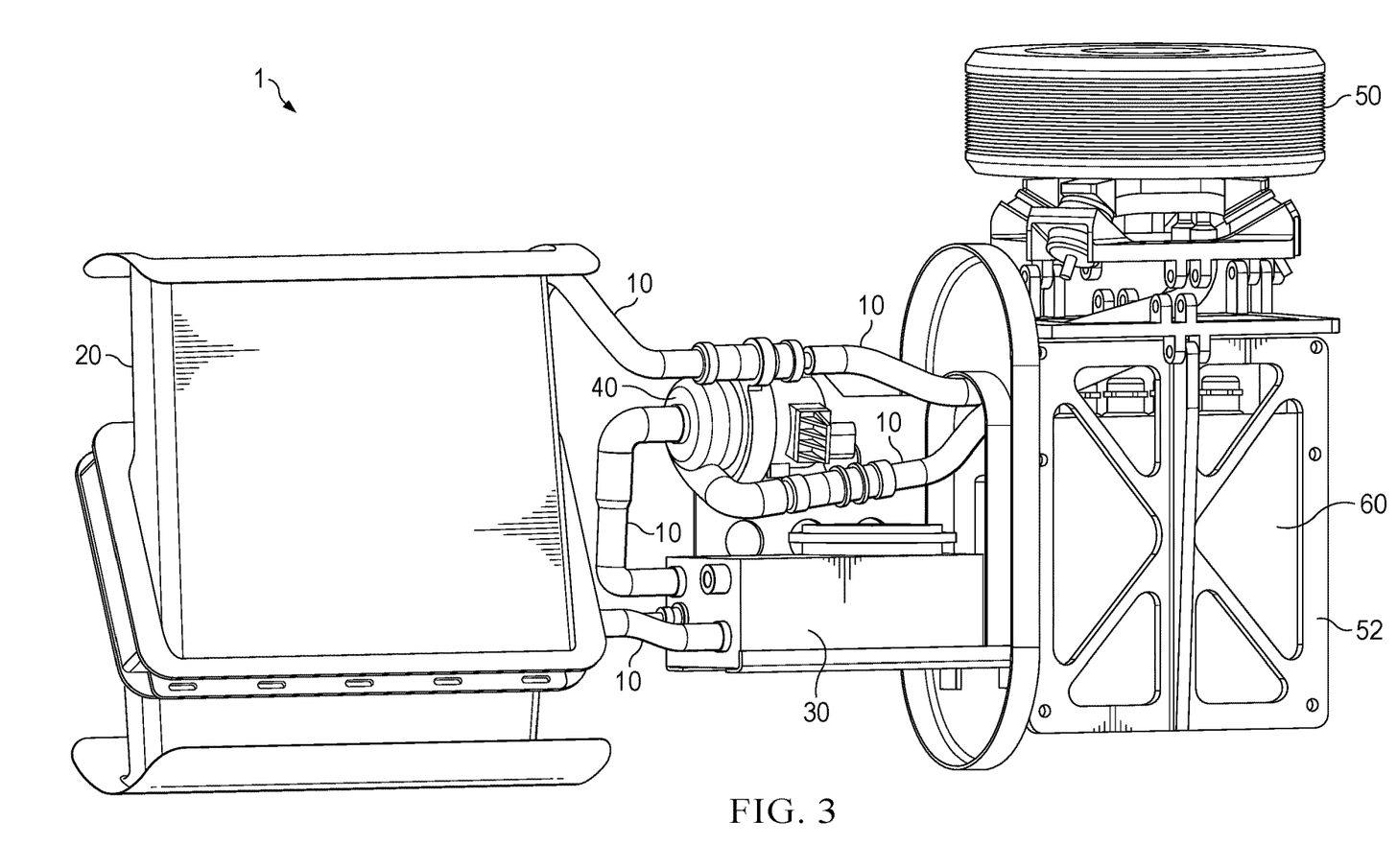
FIG. 3 shows an assembled engine unit without being mounted in a vehicle according to embodiments.

FIG. 3 shows an assembled vehicle engine unit 1 with the cooling system 11 without being mounted in or to the vehicle, e.g., a boom of an aviation vehicle.

Figure 4:
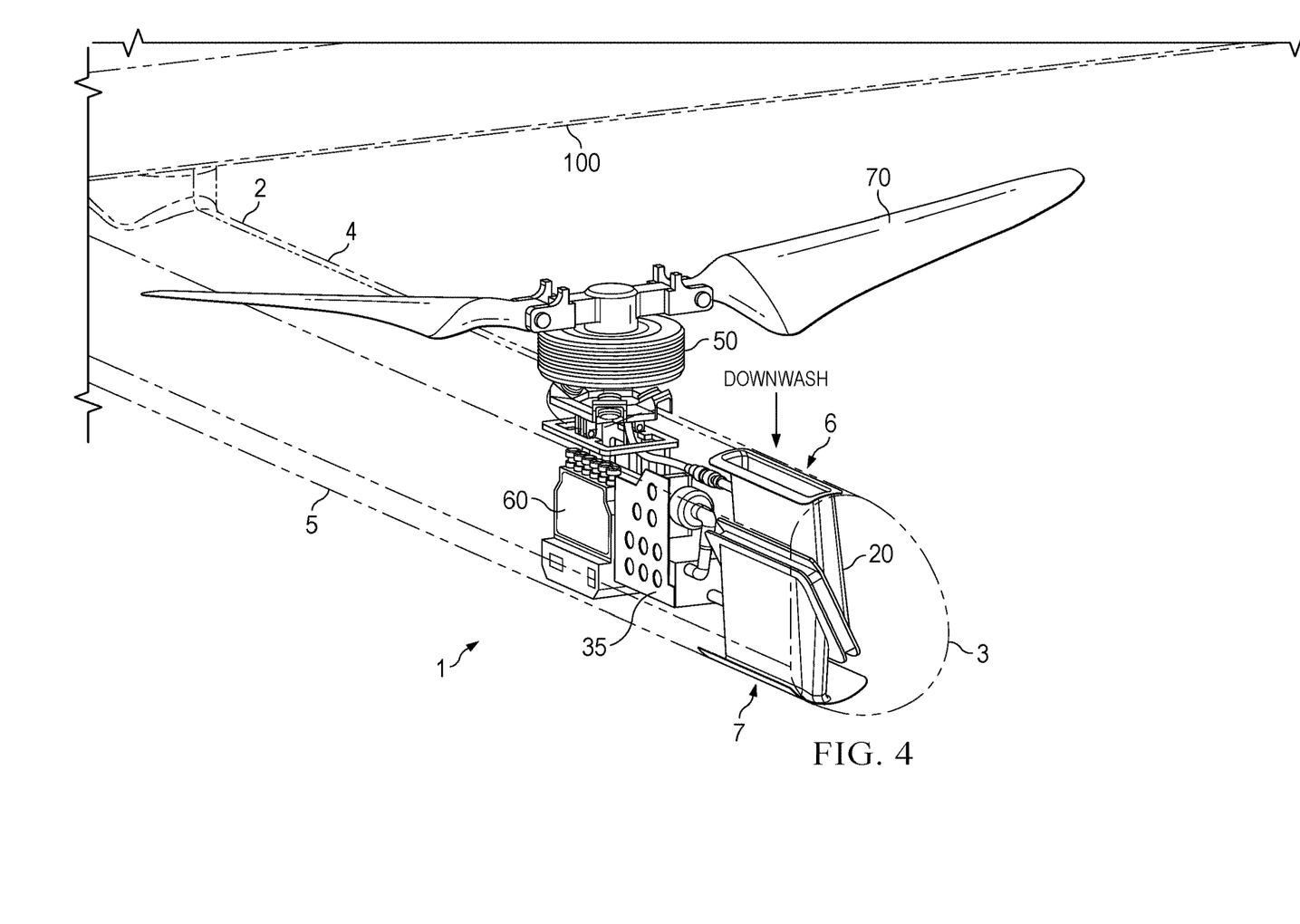
FIG. 4 shows the assembled engine unit mounted in a vehicle particularly a boom according to embodiments.

FIG. 4 shows the vehicle engine unit 1 integrated in a boom 2 of an aviation vehicle such as an aircraft and in particular such as a drone. The motor controller 60 and the electric motor 50 are mounted via a single mounting plate or, alternatively, two different mounting plates 52 next to each other in the boom 2. The mounting plate(s) 52 is/are directly mounted to the inner walls of the boom 2. As can be further seen, the heat exchanger 20 is also directly mounted to the inner walls of the boom 2. In between, the coolant storage container 30 and the pump 40 are fixed to a mounting plate 35, which in turn is also directly mounted to the inner walls of the boom 2.

In various embodiments, the heat exchanger 20 is located between a distal end 3 of the boom 2 and the motor controller 60. The motor 50 arranged on top of the motor controller 60 is connected to, operates and drives a device 70 for moving the vehicle such as a rotor or a propeller. The boom 2 has a first opening 6 at a top surface 4 or the surface facing the device 70, i.e., where the propeller is located. The boom 2 may have a second opening 7 at the bottom surface 5 or at the surface facing away from the device 70, i.e., opposite to the top surface 4.

The boom 2 may be formed as an elongated three-dimensional structure. The boom 2 may be a cuboid or a cylindrical structure with round corners such a chamfers or fillets. Alternatively, the boom 2 may be a compressed cylindrical structure having an oval cross section. Moreover, the boom 2 may have a conical frustum structure. The structures may have a rounded (distal) end 3. The end 3 may be an ellipsoid shaped end. The boom 2 may be a combination of these different structures and ends.

The boom 2 may include a storage compartment in its structure.

In various embodiments, the boom 2 is not a wing and is also not (part of) a main body of an aircraft or drone. In some embodiments the boom 2 is arranged or connected at its proximal end 2 to a wing 100 such as a rear wing and/or to a vertical stabilizer of a vehicle of aircraft. The distal end 3 of the boom 2 may not be connected to anything. Alternatively, the distal end 3 may be connected to a fin or may include a fin.

The vehicle engine unit 1 integrated into the boom 2 may now be described in more detail with respect to FIGS. 5A-5D. The first opening 6 and the second opening 7 may form a channel 8 such as an air channel. The heat exchanger 20 is arranged in the channel 8 so that an airstream provides a cooling medium for cooling the coolant via the heat exchanger 20.

Figure 5A:
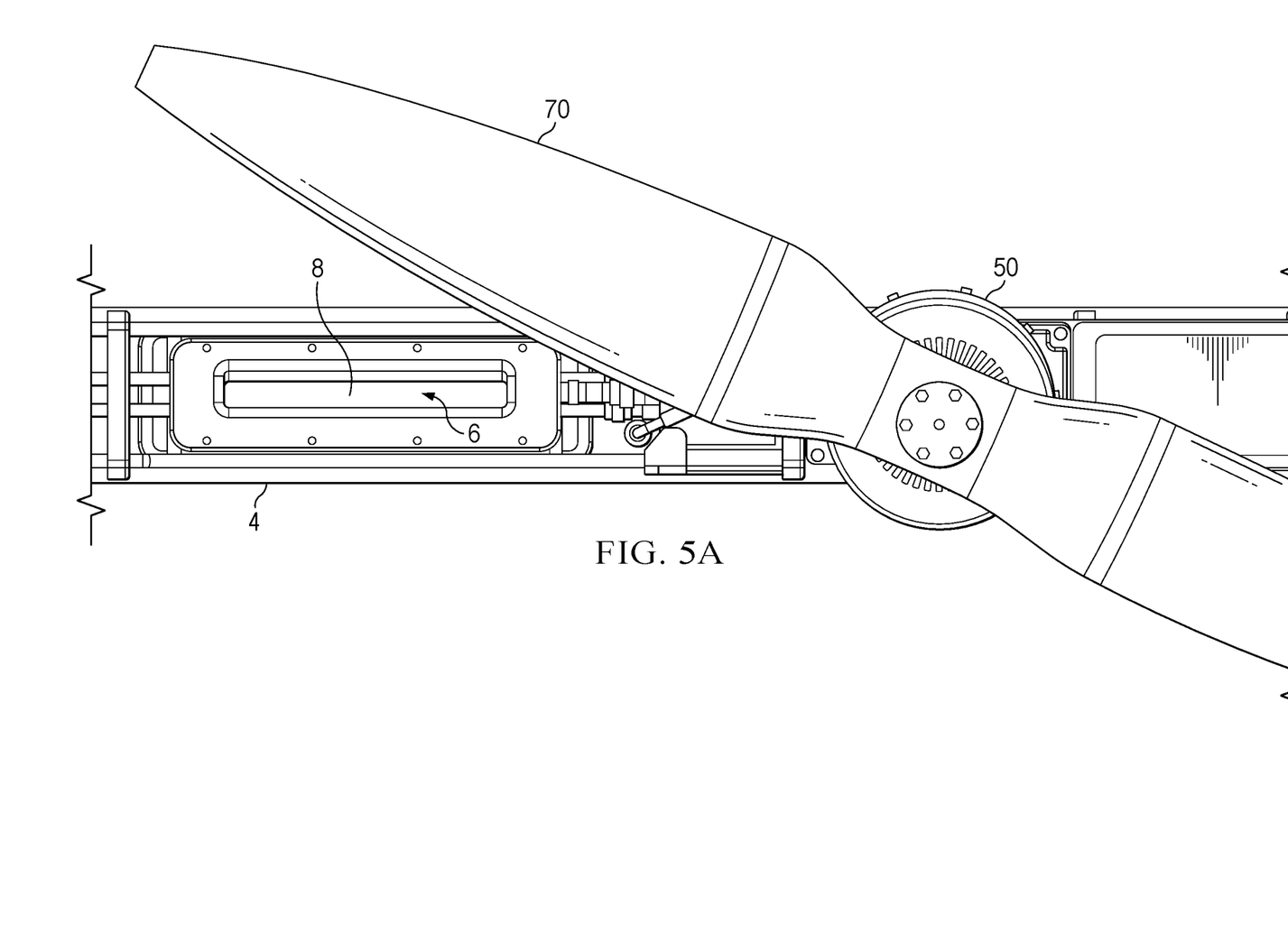
FIG. 5A shows a top view of the vehicle particularly the boom according to embodiments.
Figure 5B:
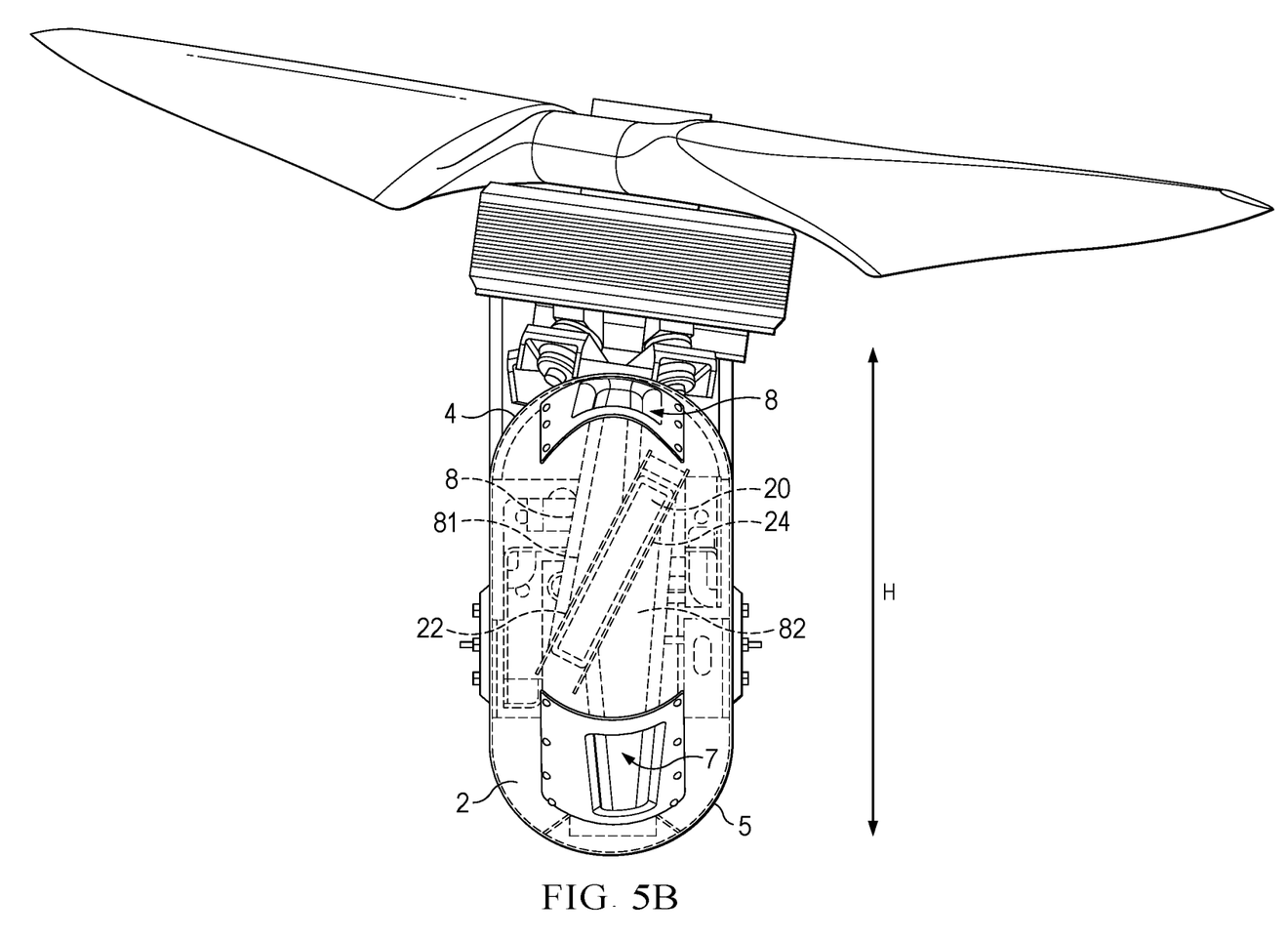
FIG. 5B shows a rear cross sectional view of the vehicle particularly the boom according to embodiments.

FIG. 5B shows a cross-section along direction H of the boom 2. In various embodiments, the channel 8 is split in two parts. A first part 81 of the channel 8 (also referred to as upstream duct) connects the opening 6 to an upper part 22 of the heat exchanger 20 and a second part 82 of the channel 8 (also referred to as downstream duct) connects the opening 7 to a lower part 24 of the heat exchanger 20. For example, the channel walls of the first part 81 and the channel walls of the second part 82 may not be directly connected to each other. The channel parts 81 and 82 may be offset with respect to each other and may be offset to a direct line in direction H. The opening 6 and the opening 7 may not be arranged symmetrically with respect to the direction H and may be aligned to each other with respect to a longitudinal direction L (see FIG. 5D). The openings 6, 7 may have the same size or, alternatively, a different size.

The heat exchanger 20 may be tilted with respect to the direction H. For example, the heat exchanger 20 may be tilted by a degree selected from between 20 degrees and 40 degrees, inclusive, or from between 25 degrees and 35 degrees, inclusive, or from between 25 degrees and 30 degrees. In a particular embodiment the tilt is 27 degrees.

The first part 81 of the channel 8 and/or the second part 82 of the channel may be tilted with respect to the direction H too. For example, the first part 81 is tilted by a degree selected from between 4 degrees and 12 degrees, inclusive, or from between 6 degrees and 10 degrees. The tilt of the first part 81 may be equal to or below 8 degrees or equal to or above 5 degrees. The second part 82 may be tilted by a degree selected from equal to or below 5 degrees or equal to or below 3 degrees. In a particular example, the tilt of the first part 81 may be 7 degrees and the tilt of the second part 82 is 0 degrees.

The tilt of heat exchanger 20 is advantageous because it is still possible to integrate the heat exchanger-ducts assembly into the boom 2. The design (tilting) of upstream duct 81 was adjusted according to a propeller downwash direction and was verified using Computational Fluid Dynamics (CFD) simulations. Having a given tilt, the airflow within the upstream duct 81 is free from flow separation therefore maximizing the efficiency of the heat exchanger-ducts assembly. In other words, the specific tilt provide the largest airflow possible through the heat exchanger 20.

The air may float through the channel 8 around or through the heat exchanger 20. The heat exchanger 20 may be arranged in the channel 8 and cover the entire cross sectional area orthogonal to the direction H of channel 8. Alternatively, the heat exchanger 20 may only overlap with a portion of the cross sectional area of the channel 8. The first part 81 of the channel 8 may increase its cross sectional area towards the heat exchanger 20 and/or the second part 82 of the channel 8 may increase its cross-sectional area towards the heat exchanger 20.

In an alternative embodiment, the first part 81 of the channel 8 and the second part 82 of the channel 8 are directly connected to each other and form a single integrated channel 8. The channel parts 81 and 82 may not be offset with respect to each other and the direction H. The cross sectional area of this channel 8 may be constant or may increase towards its middle portion. The heat exchanger 20 may be tilted in this channel 8 or may be arranged at (only) one of the channel walls. In some embodiments the cooling air may stream through the channel 8 and the heat exchanger 20, and/or around the heat exchanger 20 at a border of the channel 8.

The cooling air may be generated by the propeller or rotor 70. The rotor blades or propeller blades may move over the opening 6 in operation and each blade may entirely cover the opening 6 in a longitudinal direction L. In other words, an end of a blades of the rotor or the propeller may be positioned further away from a shaft of the rotor or the propeller in the longitudinal direction L than an end of the first opening distal to the shaft, i.e., each blade is longer than a distal end of the opening 6 with respect to (a central axis of) the motor 50 (see FIGS. 5A and 5D). Alternatively, the rotor blades or propeller blades may cover only a portion of the opening 6 in this direction.

Advantageously, such an arrangement of the heat exchanger 20 allows for sufficient cooling of the vehicle engine unit 1 (particularly the VTU) during takeoff and landing. The airstream (e.g., propeller/rotor downwash) generated by the propeller or the rotor 70 may advantageously cool the heat exchanger 20 and therefore the coolant. Moreover, having a channel 8 though the boom 2 near the propeller or rotor 70 may have a positive effect on propeller or rotor thrust since the negative effect of obstruction of thrust via the boom 2 is reduced. Finally, the heat exchanger 20 may advantageously tilted in the air channel 8 which may allow for natural convection cooling after landing.

In other embodiments the boom 2 may not only have one air channel 8 per vehicle engine unit 1 but several parallel air channels 8.

Figure 5C:
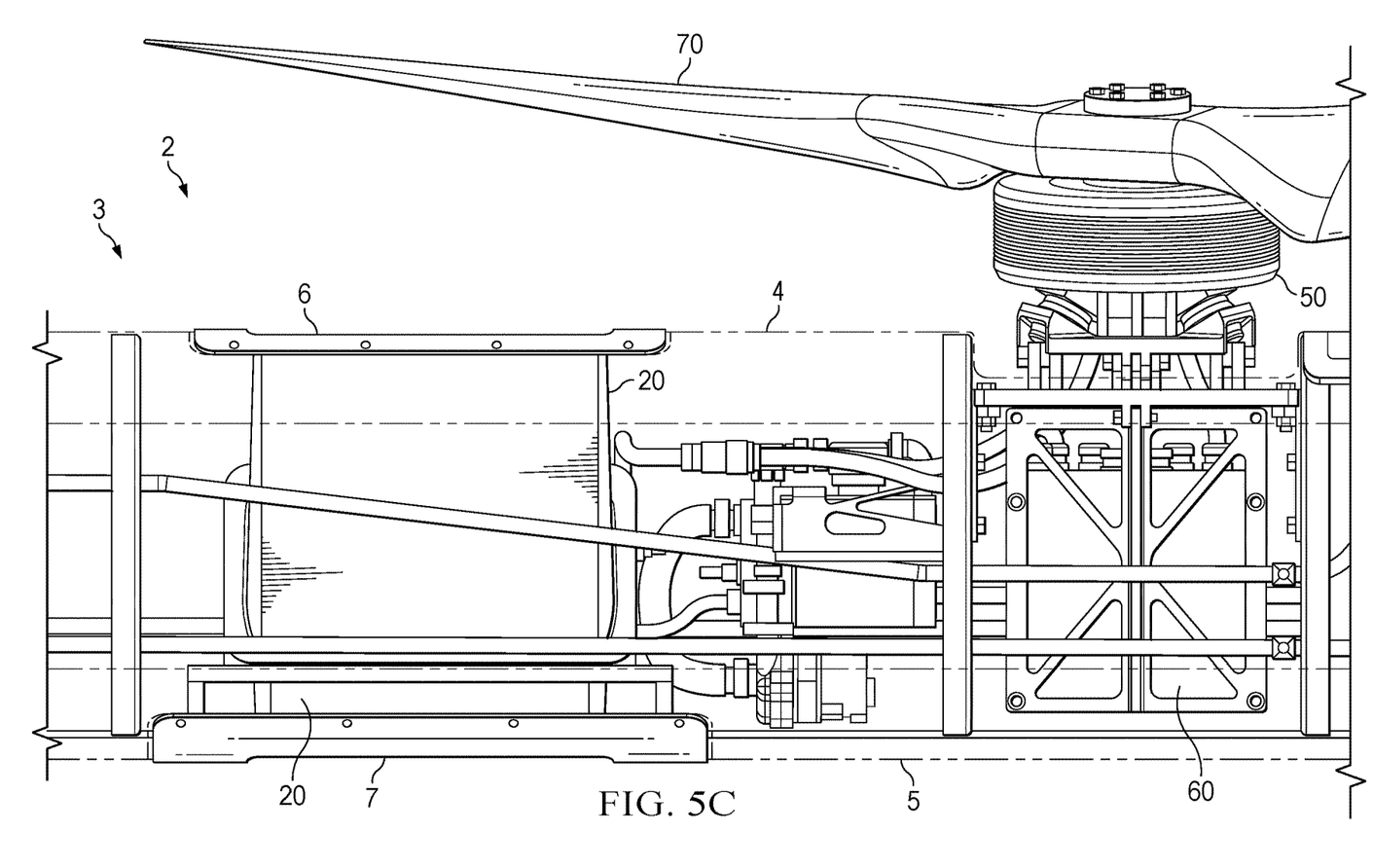
FIG. 5C shows a side cross sectional view of the vehicle particularly the boom according to embodiments.
Figure 5D:
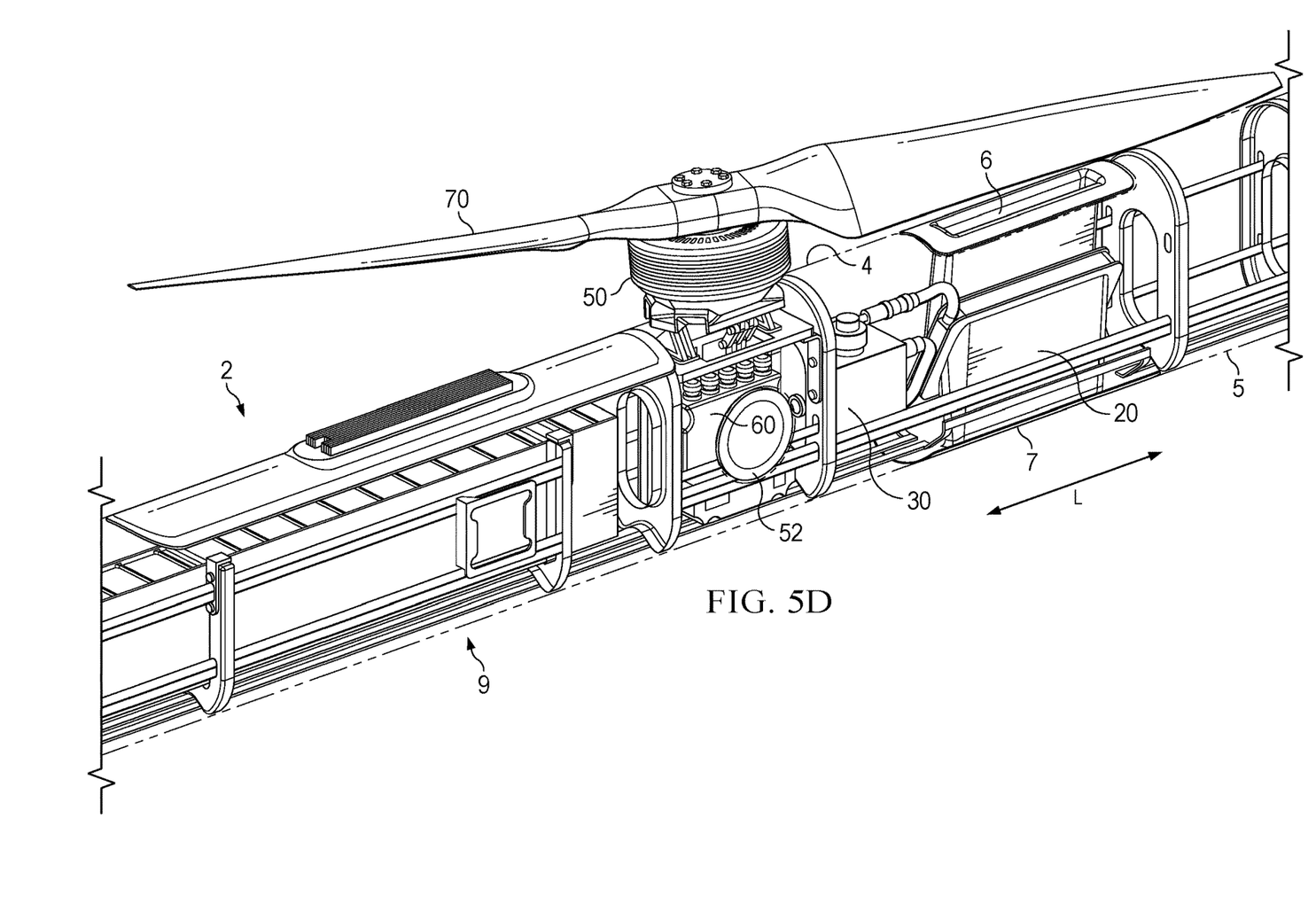
FIG. 5D shows a perspective view of the vehicle particularly the boom according to embodiments.

FIG. 5C shows a side cross sectional view of the vehicle engine unit 1 arranged in the boom 2. The coolant container 30 may have a different design in FIGS. 5A-5D than in FIGS. 2a, 3 and 4. FIG. 5D shows the vehicle engine unit 1 next to a battery cooling unit 9 mounted in the boom 2. The battery cooling unit 9 may be described in patent application Ser. No. 18/498,929, filed on Oct. 31, 2023 and titled "Battery Cooling System and Method for Operating a Battery Cooling System." This application is incorporated herein by reference in its entirety.

In various embodiments the aircraft or drone has one or more vehicle engine units 1 such as two engine units 1, three engine units 1, four engine units 1 or even six or eight engine units 1. These engine units may be placed in a single boom or in different booms or in different parts of the aviation vehicle.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A vehicle comprising:
   a boom having a first opening at a first surface and a second opening at an opposite second surface;
   a channel extending in a first direction between the first and second openings and connecting the first opening with the second opening, the channel comprising an upstream duct and a downstream duct; and
   a heat exchanger arranged in the channel and between the upstream duct and the downstream duct, wherein the upstream duct is connected, at a first upstream duct end, to the first opening, and, at a second upstream duct end, to the heat exchanger, wherein sides of a center upstream duct portion of the upstream duct are spaced apart from interior surfaces of the boom and extend straight from the first upstream duct end to the second upstream duct end, wherein the downstream duct is connected, at a first downstream duct end, to the second opening, and, at a second downstream duct end, to the heat exchanger, and wherein sides of a center downstream duct portion of the downstream duct are spaced apart from the interior surfaces of the boom and extend straight from the first downstream duct end to the second downstream duct end;
   wherein the heat exchanger is tilted with respect to the first direction.

2. The vehicle of claim 1, wherein the heat exchanger is tilted with respect to the first direction by between 25 degrees and 40 degrees, inclusive.

3. The vehicle of claim 2, wherein the heat exchanger separates the channel in a first channel portion and a second channel portion, wherein the first channel portion extends between the first opening and a first surface of the heat exchanger, and wherein the second channel portion extends between the second opening and a second surface of the heat exchanger.

4. The vehicle of claim 3, wherein the first channel portion is tilted with respect to the first direction by between 4 degrees and 12 degrees, inclusive, and wherein the second channel portion is tilted with respect to the first direction by equal or below 8 degrees.

5. The vehicle of claim 4, wherein the first channel portion has a different tilt with respect to the first direction than the second channel portion.

6. The vehicle of claim 3, wherein a cross sectional area orthogonal to the first direction increases for each of the first channel portion and the second channel portion towards the heat exchanger.

7. The vehicle of claim 1, further comprising:
   an engine unit comprising a closed cooling system, the heat exchanger and a motor located in the boom,
   wherein the cooling system connects the heat exchanger and the motor via coolant lines,
   wherein the motor is configured to operate a rotor or a propeller, and
   wherein the rotor or the propeller is configured to move air into the channel thereby cooling a coolant in the coolant lines via the heat exchanger.

8. The vehicle of claim 7, wherein the cooling system is further connected to a coolant container configured to store thermal heat via the coolant.

9. The vehicle of claim 8, wherein the coolant container comprises a phase change material configured to store thermal heat.

10. The vehicle of claim 7, wherein the first opening has a length in a second direction orthogonal to the first direction, and wherein an end of a blade of the rotor or the propeller when positioned in the second direction is further away from a shaft of the rotor or the propeller than an end of the first opening distal to the shaft.

11. A vehicle comprising:
    at least two vertical thrust units, each vertical thrust unit of the two vertical thrust units having a cooling system comprising:
      an electrical pump;
      an motor controller connected to the electrical pump;
      a motor connected to the motor controller;
      a heat exchanger connected to the motor;
      a coolant container connected to the heat exchanger;
      coolant flowable in the cooling system; and
      coolant lines providing connections that provide for flow of the coolant between at least the motor, the motor controller, the electrical pump, the heat exchanger, and the coolant container, wherein the coolant lines comprise a first coolant line connecting the coolant container to a first element that is one of the motor, the motor controller, the electrical pump, and the heat exchanger, and a further comprise a second coolant line connecting the coolant container to a second element that is one, different from the first element, of the motor, the motor controller, the electrical pump, and the heat exchanger, coolant container, wherein the coolant container is inline, in the flow of the coolant, between the first element and the second element, and wherein the coolant container has a storage capacity that is at least 4 times larger than a storage capacity of a remainder of the cooling system without the coolant container;
    wherein the cooling system with the coolant container and the coolant stored therein of one vertical thrust unit is configured to absorb thermal energy so that a time of operation, before an overheating of the one vertical thrust unit begins, is increased by approximately 30%-50% compared to the cooling system of the one vertical thrust unit without the coolant container when another one of the vertical thrust units fails, and
    wherein the vehicle is an aviation vehicle.

12. The vehicle of claim 11, wherein the coolant container comprises a phase change material configured to absorb the thermal heat.

13. The vehicle of claim 12, wherein the phase change material covers walls of the coolant container.

14. The vehicle of claim 12, wherein the coolant container is filled with the phase change material, and wherein channels for the coolant are arranged in the phase change material.

15. The vehicle of claim 12, wherein the phase change material is an organic phase change material.

16. The vehicle of claim 15, wherein the organic phase change material is paraffin wax.

17. A method for filling a cooling system with a coolant, the method comprising:

filling a first part of the cooling system of a vehicle engine unit with a first coolant, wherein the first part of the cooling system comprises first coolant lines and coolant lines of a motor;

filling a second part of the cooling system of the vehicle engine unit with a second coolant, wherein the second part of the cooling system comprises a heat exchanger, a coolant storage container and second coolant lines;

mounting the first part of the vehicle engine unit into a vehicle;

mounting the second part of the vehicle engine unit into the vehicle; and connecting first ends of the first coolant lines with first ends of the second coolant lines thereby forming a circular cooling system such that the first coolant lines and the second coolant lines provide for flow of coolant comprising the first coolant and the second coolant between at least the motor, a motor controller, an electrical pump, the heat exchanger, and the coolant container, wherein a third coolant line connects the coolant container to a first element that is one of the motor, the motor controller, the electrical pump, and the heat exchanger, and a fourth coolant line connects the coolant container to a second element that is one, different from the first element, of the motor, the motor controller, the electrical pump, and the heat exchanger, coolant container, wherein the coolant container is inline, in the flow of the coolant, between the first element and the second element, and wherein the coolant container has a storage capacity that is at least 4 times larger than a storage capacity of a remainder of the cooling system without the coolant container.

18. The method of claim 17, wherein the first coolant and the second coolant are the same.

19. The method of claim 17, wherein the first part further comprises the motor controller, and wherein filling the first part comprises filling coolant lines of the motor controller with the first coolant.

20. The method of claim 17, wherein the second part further comprises a pump configured to move the coolant.

* * * * *